US006901043B2

(12) United States Patent
Zhang et al.

(10) Patent No.: US 6,901,043 B2
(45) Date of Patent: May 31, 2005

(54) SCRATCH-OFF MATERIAL LAYER APPLIED ON OPTICAL RECORDING MEDIA (75) Inventors: Shi-Hui Zhang, Taipei Hsien (TW); Irene Chen, Taipei (TW); Hung-Hsum Huang, Hsin-Chu Hsien (TW); Hsien-Chin Liu, Taipei (TW); Kuan-Chung Chang, Tao-Yuan (TW)

(73) Assignee: U-Tech Media Corp., Tao-Yuan Hsien (TW)

( * ) Notice: Subject to any disclaimer, the term of this patent is extended or adjusted under 35 U.S.C. 154(b) by 494 days.

(21) Appl. No.: 10/064,598

(22) Filed: Jul. 29, 2002

(65) Prior Publication Data

US 2003/0223348 A1 Dec. 4, 2003

(30) Foreign Application Priority Data

May 28, 2002 (TW) ............................................ 91111371

(51) Int. Cl.⁷ ................................................ G11B 7/24
(52) U.S. Cl. .................................... 369/275.5; 428/64.4
(58) Field of Search ........................... 369/275.5, 275.1, 369/275.2, 275.4, 283, 286; 428/64.1, 64.4, 64.3; 430/320, 321, 270.11, 271.1, 273.1, 329; 380/201; 386/94

(56) References Cited

U.S. PATENT DOCUMENTS

| 5,805,551 | A | * | 9/1998 | Oshima et al. .......... 369/53.21 |
| 6,052,465 | A | * | 4/2000 | Gotoh et al. ............. 369/53.21 |
| 2003/0054128 | A1 | * | 3/2003 | Sako et al. ................. 428/64.4 |
| 2003/0185128 | A1 | * | 10/2003 | Shoji et al. ............... 369/275.3 |

FOREIGN PATENT DOCUMENTS

| CN | 2122053 U | 11/1992 |
| CN | 2462501 Y | 11/2001 |

* cited by examiner

Primary Examiner—Tan Dinh
(74) Attorney, Agent, or Firm—Winston Hsu (57) ABSTRACT An optical recording medium having a scratch-off material layer includes a transparent substrate, a reflective layer formed on the transparent substrate, a protective layer formed on the reflective layer, information formed on a surface of the protective layer, and at least one opaque scratch-off material layer formed on the protective layer for disguising the information.

27 Claims, 9 Drawing Sheets

SCRATCH-OFF MATERIAL LAYER APPLIED ON OPTICAL RECORDING MEDIA

BACKGROUND OF INVENTION

1. Field of the Invention

The present invention relates to an optical recording medium, and more particularly, to an optical recording medium having a scratch-off material layer applied on the optical recording medium.

2. Description of the Prior Art

Increasingly popular in multimedia applications, digital optical discs have advantages of low cost, high compatibility and long data preservation time. Examples include a compact disc read-only memory (CD-ROM), a CD-recordable (CD-R), a CD-rewritable (CD-RW) and a digital video disc (DVD). Each of these has become major recording medium of data storage by virtue of their thin size and high storage capacity to record large amounts of information containing characters, voice, and images.

Figure 1:
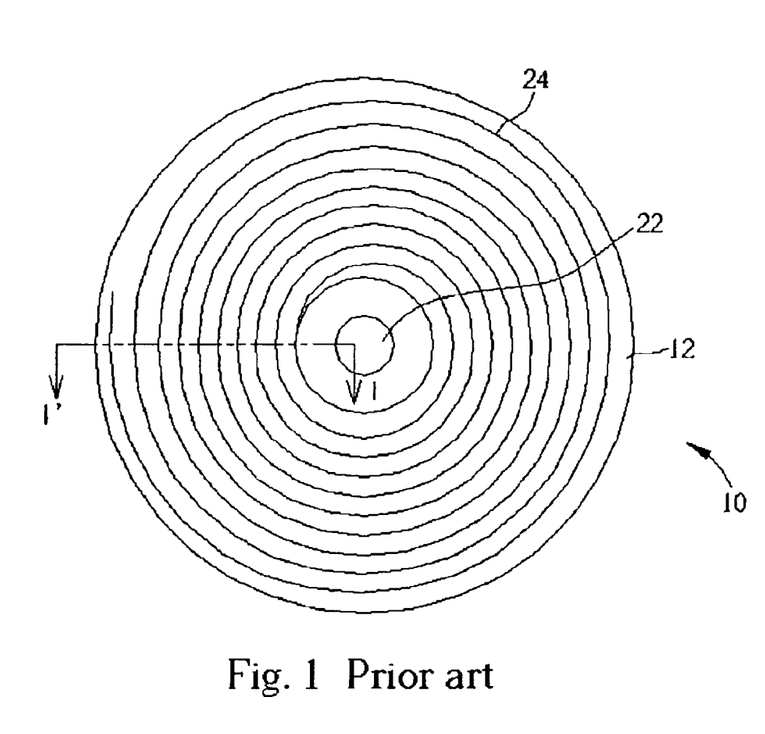
FIG. 1 is a top view of a conventional compact disc (CD).
Figure 2:
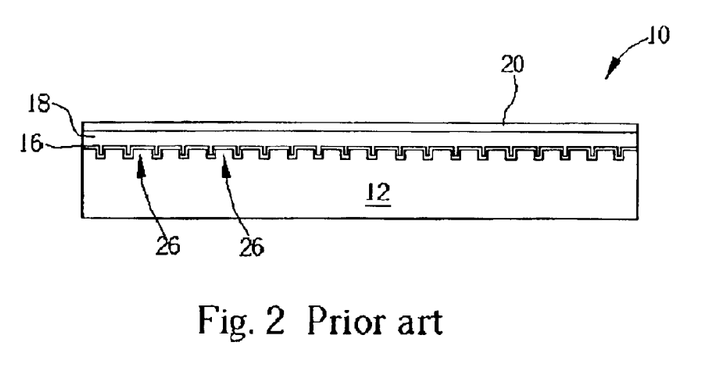
FIG. 2 is a cross-sectional diagram of the CD shown in FIG. 1.

Please refer to FIG. 1 and FIG. 2. FIG. 1 is a top view of a conventional compact disc (CD) 10. FIG. 2 is a cross-sectional diagram of the CD 10 shown in FIG. 1 along a line I–I". As shown in FIG. 1 and FIG. 2, the CD 10 includes a transparent substrate 12, a reflective layer 16 formed on the transparent substrate 12, a protective layer 18 formed on the reflective layer 16, and a printing layer 20 formed on the protective layer 18. The transparent substrate 12 also includes an opening 22 formed in central of the transparent substrate 12, and a spiral groove 24 formed on a surface of the transparent substrate 12. Typically, the CD 10 has a diameter of approximately 120 millimeter (mm) and the central opening 22 has a diameter of approximately 15 mm. The transparent substrate 12 is made of polycarbonate (PC) or polymethylmethacrylate (PMMA), and has a thickness of approximately 1.2 mm. The reflective layer 16 is made of aluminum (Al) metal, the protective layer 18 comprises acrylic resin, polycarbonate resin or ultraviolet (UV) curing resin, and has a thickness of between 1 to 100 micrometers ($\mu$m), and the printing layer 20 comprises oil printing ink or water printing ink.

The optical recording medium, such as the CD 10, always utilizes an optical read head (not shown in FIG. 1 and FIG. 2), which emits laser light to penetrate and irradiate the transparent substrate 12, to record digital data in pits 26 of the spiral groove 24 along the curvature of the transparent substrate 12 or read the digital data stored in the pits 26. Increasingly popular in personal computers (PCs) and audio-visual equipments, the information stored in the optical recording medium, such as computer software, music or images, brings a lot of convenience and fun to people. However, the general optical recording medium is easy to mass copy illegally with a CD burner or other machines, which effects the rights and interests of factories, stores, and users who bought an original edition CD. In addition, users of the illegally copied disc are not provided with service, technological support, product guarantees, or software upgrades. In order to prevent the above problems, and provide perfect service and guarantees to the users, it is important to prevent illegal copying and buying of optical discs and to increase sales of the original optical disc.

SUMMARY OF INVENTION

It is therefore a primary objective of the claimed invention to provide an optical recording medium having a scratch-off material layer applied on the optical recording medium.

It is another object of the claimed invention to provide an optical recording medium that protects against illegal copying of the medium and proposes payment benefits.

According to the preferred embodiment of the claimed invention, the optical recording medium comprises a transparent substrate, a reflective layer formed on the transparent substrate, a protective layer formed on the reflective layer, information formed on a surface of the protective layer, and at least one opaque scratch-off material layer formed on the protective layer for disguising the information.

According to the second embodiment of the claimed invention, the optical recording media comprises a transparent substrate having a first recordable region for recording a first specific data and a second recordable region for recording a second specific data, a reflective layer formed on the transparent substrate, a protective layer formed on the reflective layer, and not covering the second recordable region, and at least one opaque scratch-off material layer formed on the protective layer and covering the second recordable region. When the scratch-off material layer is not scratched, the second specific data is a readable data, and when the scratch-off material layer is scratched, the first specific data is a readable data and the second specific data is a non-readable data.

In the claimed invention, the scratch-off material layer is formed on a surface of the optical recording medium. By scratching the scratch-off material layer, the second specific data of the second recordable region under the scratch-off material layer cannot be read to prevent illegal copying of the optical recording medium. In addition, a utility deadline or utility times can be limited in the claimed invention to provide a general idea of the users paying while using the optical recording medium. Furthermore, the scratch-off material layer formed on the optical recording medium provides a recreational functionality, so that the optical recording medium of the claimed invention has advantages of having practical utility, functionality, and entertainment.

These and other objectives of the claimed invention will no doubt become obvious to those of ordinary skill in the art after reading the following detailed description of the preferred embodiment that is illustrated in the various figures and drawings.

DETAILED DESCRIPTION

The present invention utilizes a compact disc (CD) as an example. But the present invention is not limited to this, a scratch-off material layer of the present invention can be applied on various kinds of optical recording medium, such as a CD-recordable (CD-R), a CD-rewritable (CD-RW) (only applied in an embodiment of FIG. 3 and FIG. 4), a video CD (VCD), a digital video disc-5 (DCD-5) or a DVD-9.

Figure 3:
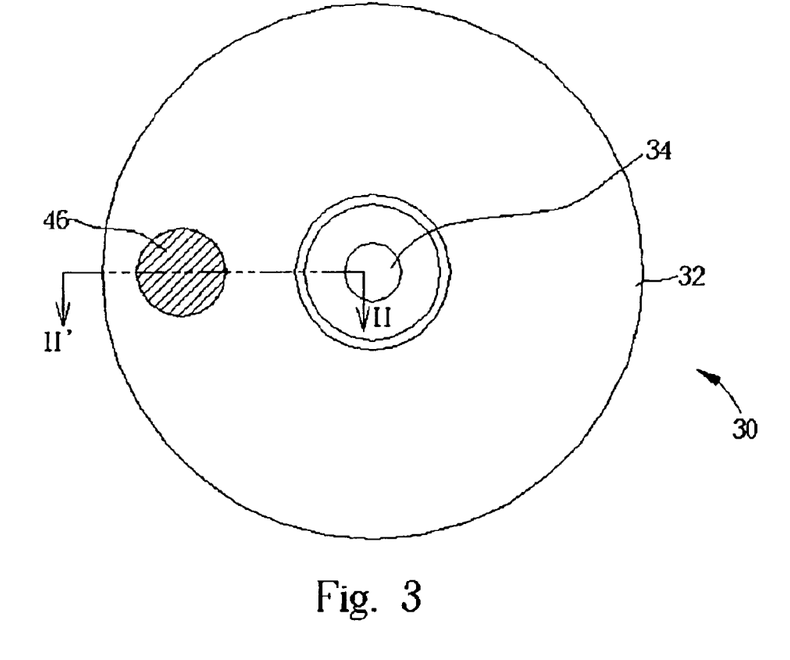
FIG. 3 is a top view of a CD having a scratch-off material layer according to a first embodiment of the present invention.
Figure 4:
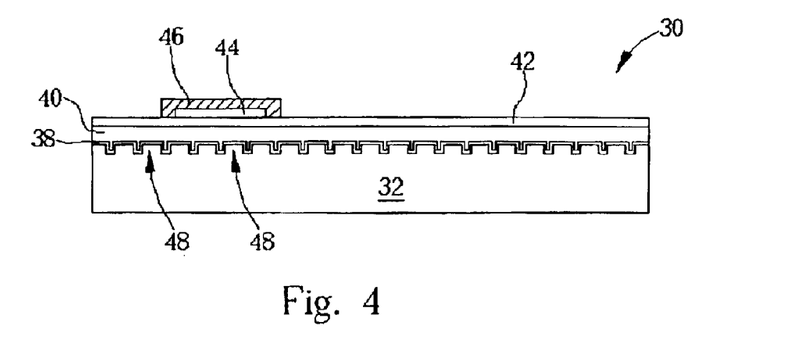
FIG. 4 is a cross-sectional diagram of the CD shown in FIG. 3.

Please refer to FIG. 3 and FIG. 4. FIG. 3 is a top view of a CD 30 having a scratch-off material layer 46 according to a first embodiment of the present invention. FIG. 4 is a cross-sectional diagram of the CD 30 shown in FIG. 3 along a line II—II. As shown in FIG. 3 and FIG. 4, the CD 30 includes a transparent substrate 32, a reflective layer 38 formed on the transparent substrate 32, a protective layer 40 formed on the reflective layer 38, a printing layer 42 formed on the protective layer 40, information 44 formed on the printing layer 42, and an opaque scratch-off material layer 46 formed on the printing layer 42 for disguising the information 44. The information 44 includes at least one serial number, secret code, or rewarding information, composed of characters or pattern signs. The transparent substrate 32 also includes a central opening 34 and a plurality of pits 48 surrounding the central opening 34 spirally for storing digital information. The pits 48 are formed by sintering of laser light. Additionally, an anti-scratching protective layer (not shown in FIG. 3 and FIG. 4) is formed on the protective layer 40 to prevent the surface of the CD from being scratched, and an intermediate layer (not shown in FIG. 3 and FIG. 4) is formed between the reflective layer 38 and the transparent substrate 32 to improve adhesion between the reflective layer 38 and the transparent substrate 32.

In the preferred embodiment of the present invention, the transparent substrate 32 comprises polymer, such as acrylic resin, PC resin, polystyrene (PS) resin, polyvinyl chloride (PVC), epoxy resin, and polyester resin, or inorganic material, such as glass. The transparent substrate 32 has a light refractive index of approximately 1.4 to 1.6, a light penetrating index of above 85%, and is anisotropic. The reflective layer 38 is used to reflect laser light so it is composed of materials having high reflectance, such as gold (Au), silver (Ag), aluminum (Al), copper (Cu), platinum (Pt), chromium (Cr), metal alloy, or metal compound, with Au being preferred. The reflective layer 38 is formed by a vapor deposition process, an ion electroplating process, a sputtering deposition process, or an evaporating process, and the reflective layer 38 has a thickness of approximately 30 to 150 nanometer (nm).

In addition, the protective layer 40 must have enough adhesion and strong hardness relative to a hardness of the optical read head to prevent peeling off from the CD 30 and being rubbed off by the optical read head. And the protective layer 40 has to be pervious to the laser light while the protective layer 40 is applied on a DVD-9 format containing at least two data layers on the transparent substrate. The protective layer 40 comprises acrylic resin, epoxy resin, polycarbonate (PC) resin, ultraviolet (UV) curing resin, diamond-like carbon (DLC), metal nitride ($A_xN_{1-x}$), metal oxide ($A_xO_{1-x}$), silicon nitride ($SiN_x$), silicon oxide ($SiO_s$), sulfide zinc-silicon dioxide ($ZnS-SiO_2$), titanium oxide ($TiO_x$), or carbide. The protective layer 40 is formed by a physical vapor deposition (PVD) process, a chemical vapor deposition (CVD) process, a sputtering deposition process, a spin-coating process, or an evaporating process, and has a thickness of approximately 3 to 30 micrometers. The printing layer 42 comprises light curing printing ink, colors, dye, or additives. Desired characters and images can be printed by a screen-printing process or a chromatography process on the protective layer 40 according to users demands or designs. The scratch-off material layer 46 is a silver lacquer layer or is an opaque material layer comprising elastomeric resin, organic solvent, powder additive, and pigment. The scratch-off material layer 46 is scratched easily and formed by gravure, flexo printing, screen-printing, offset, a letterpress process, or a spin-coating process.

Additionally, the information 44 printed on the printing layer 42 can be designed to include various characters or pattern signs, such as a prizing message or a serial number according to the users demand. So that the users can utilize their fingers, coins, or a scraper to scratch the scratch-off material layer 46 and read the information 44 and to enter the serial number in a website to know if the users win the prize. The information 44 and the printing layer 42 can be formed simultaneously or respectively. The information 44 can be a paster to paste on any position of the surface of the printing layer 44. As long as the scratch-off material layer 46 covers the information 44 and prevents the users from reading the information 44 beforehand, the scratch-off material layer 46 can be designed in various shapes, such as a heart shape or a star-like shape.

Figure 5:
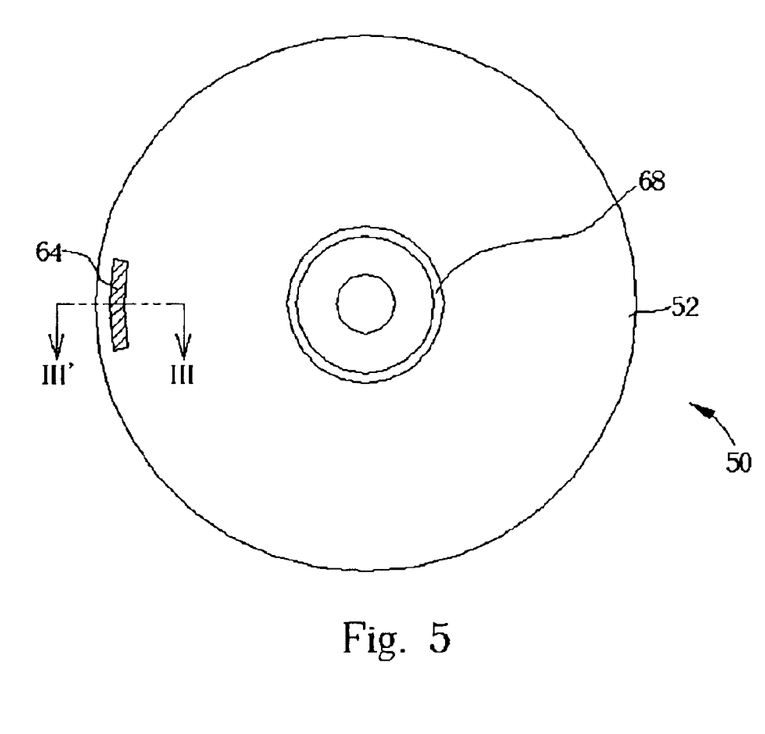
FIG. 5 is a top view of a CD having a scratch-off material layer according to a second embodiment of the present invention.
Figure 6:
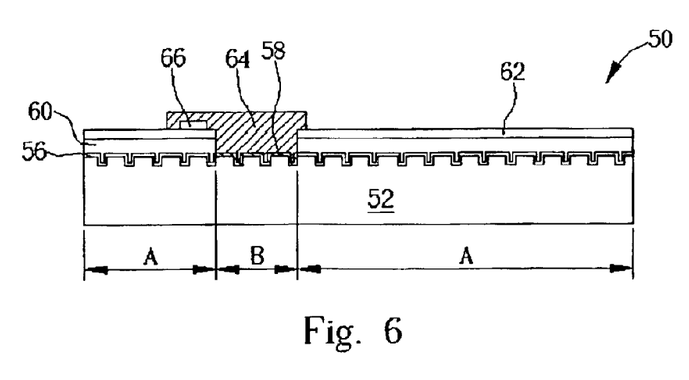
FIG. 6 is a cross-sectional diagram of the CD shown in FIG. 5.

Please refer to FIG. 5 and FIG. 6. FIG. 5 is a top view of a CD 50 having a scratch-off material layer 64 according to the second embodiment of the present invention. FIG. 6 is a cross-sectional diagram of the CD 50 shown in FIG. 5 along a line III—III. As shown in FIG. 5 and FIG. 6, the CD 50 includes a transparent substrate 52 having a first recordable region A for recording a first specific data and a second recordable region B for recording a second specific data, a reflective layer 56 formed on the transparent substrate 52 outside the second recordable region B, a reflective film 58 formed on the second recordable region B for being a reflective interface of the second recordable region B, a protective layer 60 formed on the reflective layer 56 and not covering the second recordable region B, a printing layer 62 formed on the protective layer 60, and an opaque scratch-off material layer 64 formed on any position of the printing layer 62 and covering the second recordable region B. The CD 50 also includes information 66 printed in the printing layer 62, which comprises at least one serial number, secret code, or rewarding information, composed of characters or pattern signs. When the scratch-off material layer 64 is not scratched, the CD 50 can utilize an optical read head (not shown in FIG. 5 and FIG. 6) to read the second specific data and a portion of the first specific data stored in the transparent substrate 52. And when the scratch-off material layer 64 is scratched, if a bonding ability between the reflective film 58 and the transparent substrate 52 is weaker than a bonding ability between the reflective layer 56 and the transparent substrate 52, the reflective film 58 on the second recordable region B is destroyed and scratched simultaneously, and the laser light generated by the optical read head can not reflect from the second recordable region B and thus causes the second specific data to be non-readable data.

Furthermore, the reflective film 58 is a semi-reflective film. When the scratch-off material layer 64 is not scratched, the laser light penetrates the reflective film 58 on the second recordable region B and the scratch-off material layer 64 to form a total reflection to read the second specific data stored in the second recordable region B. But when the scratch-off material layer 64 is scratched, only the reflective film 58 remains on the second recordable region B and cannot reflect totally, thus causing the second specific data to be non-readable data.

Figure 7:
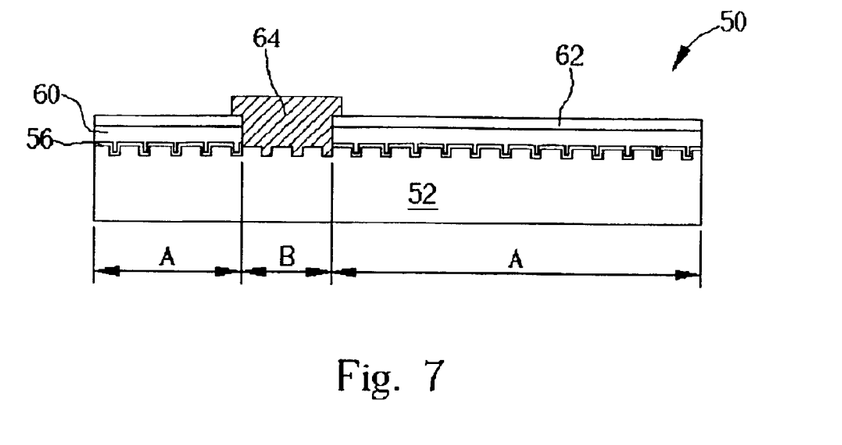
FIG. 7 is a cross-sectional diagram illustrating a CD having a scratch-off material layer according to a third embodiment of the present invention.

Please refer to FIG. 7, which is a cross-sectional diagram illustrating the CD 50 having a scratch-off material layer 64 according to the third embodiment of the present invention. As shown in FIG. 7, the CD 50 includes a transparent substrate 52 having a first recordable region A for recording a first specific data and a second recordable region B for recording a second specific data, a reflective layer 56 formed on the transparent substrate 52 outside the second recordable region B, a protective layer 60 formed on the reflective layer 56, a printing layer 62 formed on the protective layer 60 and not covering the second recordable region B, and an opaque scratch-off material layer 64 formed on the printing layer 62 and covering the second recordable region B. The scratch-off material layer 64 has a high reflectance in order to be a reflective interface of the second recordable region B of the transparent substrate 52. So that when the scratch-off material layer 64 is not scratched, the CD 50 utilizes an optical read head to read the second specific data and a portion of the first specific data. When the scratch-off material layer 64 is scratched, the second recordable region B does not have a reflective interface on the second recordable region B, thus causing the second specific data to be non-readable data.

Figure 8:
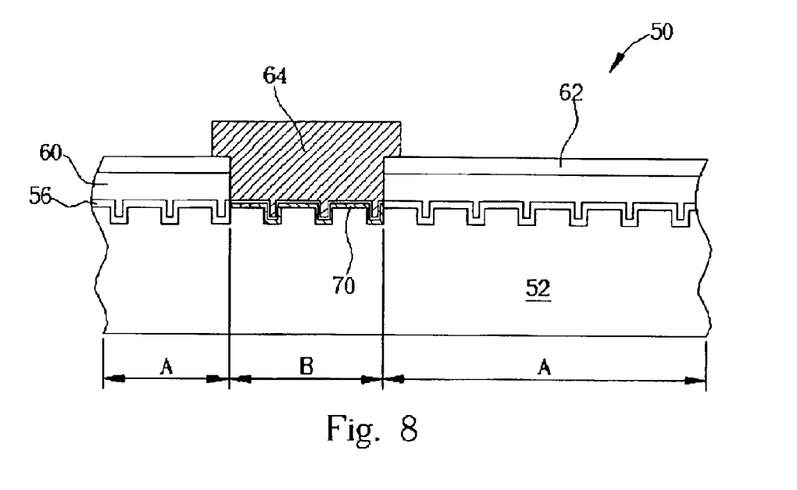
FIG. 8 is a cross-sectional diagram illustrating a CD having a scratch-off material layer according to a fourth embodiment of the present invention.

Please refer to FIG. 8, which is a cross-sectional diagram illustrating the CD 50 having a scratch-off material layer 64 according to the fourth embodiment of the present invention. As shown in FIG. 8, the CD 50 includes a transparent substrate 52 having a first recordable region A for recording a first specific data and a second recordable region B for recording a second specific data, a reflective layer 56 formed on the transparent substrate 52 and covering the transparent substrate 52 and the second recordable region B, a protective layer 60 formed on the reflective layer 56 and not covering the second recordable region B, a printing layer 62 formed on the protective layer 60, and an opaque scratch-off material layer 64 formed on the printing layer 62 and covering the second recordable region B. The CD 50 also includes a sacrificial layer 70 formed between the second recordable region B of the transparent substrate 52 and the reflective layer 56. When the scratch-off material layer 64 is scratched, if a bonding ability between the reflective layer 56 and the sacrificial layer 70 is weaker than a bonding ability between the reflective layer 56 and the transparent substrate 52, a portion of the reflective layer 56 on the second recordable region B is destroyed and scratched simultaneously, thus causing the second specific data to be non-readable data. If a bonding ability between the sacrificial layer 70 and the transparent substrate 52 is weaker than a bonding ability between the reflective layer 56 and the transparent substrate 52, when the scratch-off material layer 64 is scratched, a portion of the reflective layer 56 on the second recordable region B and the sacrificial layer 70 are destroyed and scratched simultaneously, thus causing the second specific data to be non-readable data.

Figure 9:
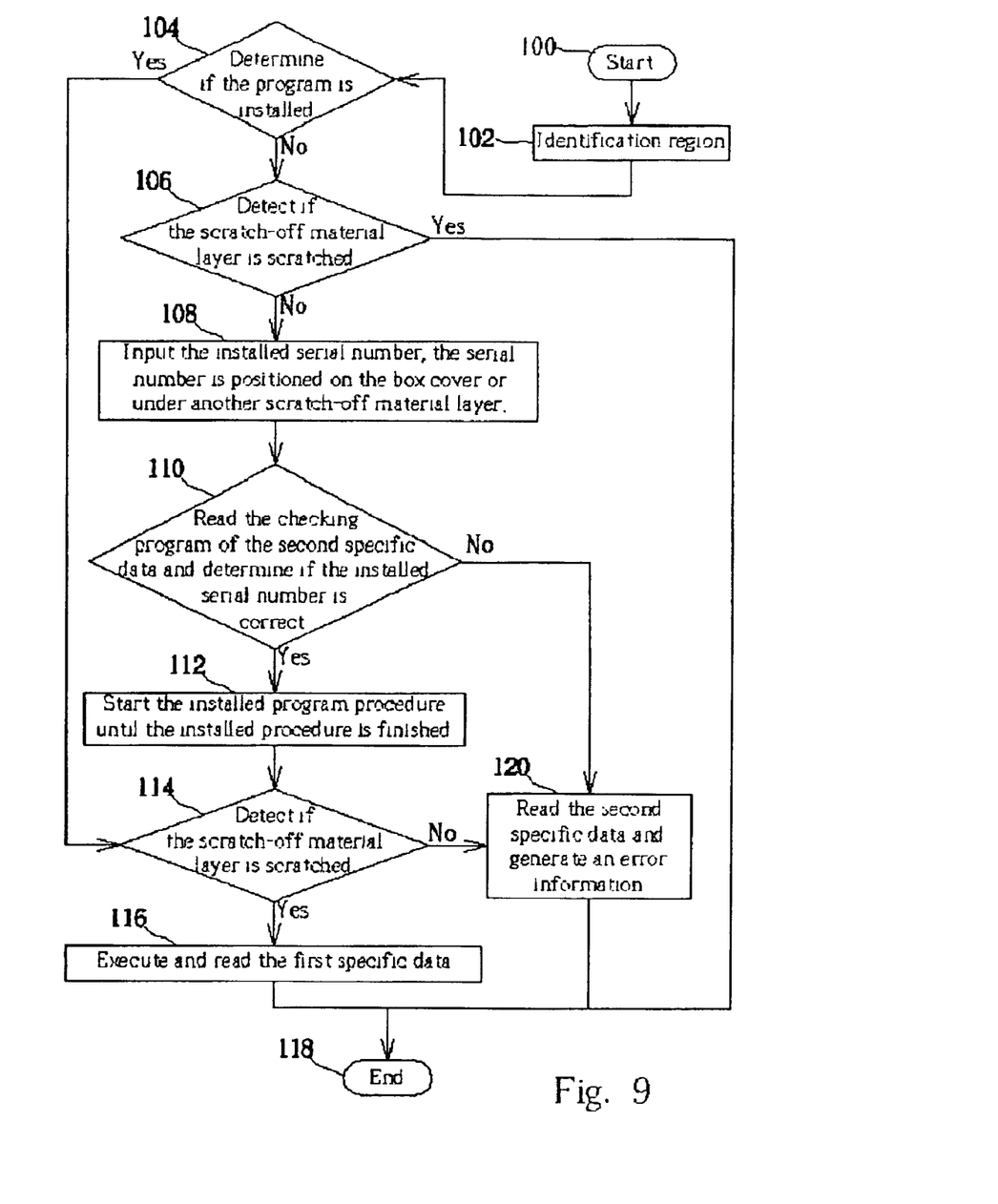
FIG. 9 is a flow chart of a program that is executed to read the CD having the scratch-off material layer according to the present invention.

Please refer to FIG. 9, which is a flow chart of a program that is executed to read the CD 50 having the scratch-off material layer 64 according to the present invention. In step 100 and step 102 of the flow chart, when users start to use the CD 50, the optical read head emits laser light and reads an identification region of the CD 50, and then goes to step 104. The identification region 68 includes a determining program for determining if the program of the first specific data of the CD 50 is installed. If yes, go to step 114. Otherwise, proceed to step 106. In step 106, the laser light reads the second specific data of the second recordable region B of the CD 50 to detect if the scratch-off material layer 64 is scratched. If the second specific data can be read, it represents that the scratch-off material layer 64 is not scratched, go to step 108. If the second specific data cannot be read, it represents that the scratch-off material layer 64 is scratched, go to step 118 to finish the installed procedure. In step 108, a system will ask the users to input the installed serial number printed on the box cover or under another scratch-off material layer (not shown in FIG. 5 to FIG. 8). Before the users install the program, the scratch-off material layer has to be scratched beforehand to get the installed serial number. After the users input the installed serial number, go to step 110. The laser light will read a checking program of the second specific data and determine if the installed serial number is correct. If not, go to step 120, and the laser light will read the second specific date of the second recordable region B. The second specific data includes an error information generating program, a loop program, or a network on-line program, and the system will generate an error information or connect to a website of the original CD 50 to ask the users to scratch the scratch-off material layer first to get the serial number or the secret code printed on the printing layer 62 to install the program of the CD 50, and then go to step 118 to terminate the procedure. If the installed serial number is correct, and then go to step 112. The laser light will read the installed program and start the installed procedure until the procedure is finished, and then go to step 114.

When the users have installed the program of the first specific data and desire to read or execute the program, the users have to scratch the scratch-off material layer 64 of the CD 50 first. In step 114, the laser light will read the second specific data of the second recordable region B for detecting if the scratch-off material layer 64 is scratched. If the second specific data cannot be read, it represents that the scratch-off material layer 64 is scratched, go to step 116 to read or execute the installed program of the first specific data. If the second specific data can be read, it represents that the scratch-off material layer 64 is not scratched, go to step 120. The laser light will read the second specific data of the second recordable region B. Since the second specific data includes the error information generating program, the loop program, or the network on-line program, the system will generate an error information or connect to a website of the original CD 50 to ask the users to scratch the scratch-off material layer 64 for reading and executing the program on the CD 50. The second specific data also includes an uninstalled program or an interrupted program. When the program of the first specific data is executed and read while the scratch-off material layer 64 is not scratched, the uninstalled program or the interrupted program will uninstall or interrupt the program of the first specific data. Only after the users scratch the scratch-off material layer 64 will the laser light read the information of the first specific data to execute the program of the first specific data. Finally, go to step 118 and finish the procedure.

In addition, the second specific data of the second recordable region B also includes error configuration information of the CD, such as pseudo-configuration information. A file capacity of the pseudo-configuration information is larger than a capacity of the CD. Therefore, when the users want to copy the CD 50 illegally, the copying process cannot proceed while a CD burner reads the error configuration information of the second specific data, so as to prevent illegal copying. The second specific data also includes a time-checking program so as to limit a utility deadline of the CD 50. Furthermore, the CD 50 has a plurality, such as 10, of scratch-off material layers 64 formed on the CD 50, and an installed checking program is stored in the transparent substrate 52 under the scratch-off material layers 64. So the CD 50 can be installed 10 times only. If the users scratch one of the scratch-off material layers 64, the CD 50 decreases one time to install the program so as to promote a general idea of the users paying while using the optical recording medium.

To sum up, the present invention has the scratch-off material layer formed on the surface of the optical recording medium. When the scratch-off material layer is not scratched, the program stored in the first specific data of the CD can be installed. But when the users desire to execute the program, the scratch-off material layer has to be scratched first. If not, the program and information stored in the first specific data of the CD cannot be executed and read, thus preventing illegal copying. The present invention can force the users to register in the websites of the original CD. The present invention can also limit the utility deadline or utility times of the CD. Additionally, the first specific data and the second specific data include various programs and information according to designs of the factories and demand of the users to achieve multi-functionality of the CD. After scratching the scratch-off material layer and registering by the users, the information and the program of the CD can be read and executed completely.

In contrast to the prior art, the CD of the present invention includes the scratch-off material layer formed on the surface of the CD. So that the optical recording medium of the present invention has a recreational functionality and can prevent illegal copying by way of the scratch-off material layer. Therefore, the optical recording medium of the present invention has advantages of having practical utility, multi-functionality, and recreation.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. Optical recording media having a scratch-off material layer comprising:
   a transparent substrate comprising a first recordable region for recording a first specific data and a second recordable region for recording a second specific data;
   a reflective layer formed on the transparent substrate;
   a protective layer formed on the reflective layer, and not covering the second recordable region; and
   at least one opaque scratch-off material layer formed on the protective layer and covering the second recordable region;
   wherein when the scratch-off material layer is not scratched, the first and second specific data are is-a readable data, and when the scratch-off material layer is scratched, the first specific data is a readable data and the second specific data is becomes a non-readable data.

2. The optical recording media of claim 1 wherein the transparent substrate comprises a central opening and a plurality of pits surrounding the central opening spirally for storing digital information.

3. The optical recording media of claim 1 wherein the reflective layer covers the transparent substrate outside the second recordable region, and the optical recording media further comprises a reflective film formed on the transparent substrate of the second recordable region for being a reflective interface of the second recordable region.

4. The optical recording media of claim 3 wherein a bonding ability between the reflective film and the transparent substrate of the second recordable region is weaker than a bonding ability between the reflective layer and the transparent substrate, and when the scratch-off material layer is scratched, the reflective film on the second recordable region is destroyed due to the scratch, thus causing the second specific data to be non-readable data.

5. The optical recording media of claim 3 wherein the reflective film is a semi-reflective film. When the scratch-off material layer is not scratched, the semi-reflective film maintains full reflection with the scratch-off material layer, and when the scratch-off material layer is scratched, the reflective film on the second recordable region cannot reflect totally, thus causing the second specific data to be non-readable data.

6. The optical recording media of claim 1 wherein the reflective layer does not cover the second recordable region, and the scratch-off material layer has a high reflectance for being a reflective interface of the second recordable region.

7. The optical recording media of claim 1 wherein the reflective layer covers the transparent substrate and the second recordable region completely.

8. The optical recording media of claim 7 further comprising a sacrificial layer formed between the transparent substrate of the second recordable region and the reflective layer, and when the scratch-off material layer is scratched, a portion of the reflective layer on the transparent substrate of the second recordable region is destroyed due to the scratch, thus causing the second specific data to be non-readable data.

9. The optical recording media of claim 8 wherein a bonding ability between the reflective layer and the sacrificial layer is weaker than a bonding ability between the reflective layer and the transparent substrate.

10. The optical recording media of claim 8 wherein a bonding ability between the sacrificial layer and the transparent substrate is weaker than a bonding ability between the reflective layer and the transparent substrate.

11. The optical recording media of claim 1 wherein the reflective layer comprises gold (Au), silver (Ag), aluminum (Al), copper (Cu), platinum (Pt), chromium (Cr) alloy and aluminum nitride ($AlN_x$ and the protective layer comprises acrylic resin, polycarbonate (PC) resin, ultraviolet (UV) curing resin, diamond-like carbon (DLC), metal nitride ($A_xN_{1-x}$), metal oxide ($A_xO_{1-x}$), silicon nitride ($SiN_x$), silicon oxide ($SiO_3$), sulfide zinc-silicon dioxide ($ZnS$—$SiO_2$), titanium oxide ($TiO_x$) and carbide.

12. The optical recording media of claim 1 further comprising a printing layer formed on the protective layer.

13. The optical recording media of claim 12 wherein the printing layer covers a portion of the second recordable region, and the printing layer comprises at least one serial number, secret code and rewarding information, composed of characters or pattern signs, printed in the printing layer.

14. The optical recording media of claim 13 wherein the second specific data comprises at least one checking program for requesting users to input and for verifying the serial number or the secret code printed in the printing layer above the second recordable region.

15. The optical recording media of claim 1 wherein the scratch-off material layer is a silver lacquer layer.

16. The optical recording media of claim 1 wherein the scratch-off material layer comprises elastomeric resin, organic solvent, powder additive and pigment.

17. The optical recording media of claim 1 wherein the scratch-off material layer has a specific shape.

18. The optical recording media of claim 17 wherein the specific shape comprises a geometric shape and a non-geometric shape.

19. The optical recording media of claim 1 wherein when the scratch-off material layer is not scratched, the second specific data is read and executed before the first specific data.

20. The optical recording media of claim 19 wherein the second specific data that is read before the first specific data will influence a readable completeness of the first specific data.

21. The optical recording media of claim 20 wherein the second specific data comprises an error information generating program, a loop program, a secret code checking program, a network on-line program, a time checking program and an error configuration information of the optical recording media.

22. The optical recording media of claim 19 wherein the second specific data comprises art installed program for installing a program of the first specific data and an installed serial number.

23. The optical recording media of claim 22 wherein the first specific data further comprises at least one checking program for verifying the installed serial number of the second specific data while installing the program of the first specific data.

24. The optical recording media of claim 23 wherein the second specific data further comprises an uninstalled program and an interrupted program.

25. The optical recording media of claim 24 wherein when the program of the first specific data is executed while the scratch-off material layer is not scratched, the uninstalled program will uninstall the program of the first specific data.

26. The optical recording media of claim 24 wherein when the program of the first specific data is executed while the scratch-off material layer is not scratched, the interrupted program will interrupt the program of the fist specific data.

27. The optical recording media of claim 1 wherein the optical recording media comprises a Compact Disc (CD), a Video CD (VCD) and a Digital Video Disc (DVD).

* * * * *